United States Patent
Durocher et al.

(10) Patent No.: US 10,147,117 B2
(45) Date of Patent: *Dec. 4, 2018

(54) APPARATUS AND METHOD FOR ENHANCING TRANSACTIONS USING RULE INFORMATION TO COMMUNICATE WITH MULTIPLE APPLICATIONS

(71) Applicant: ACCENTURE GLOBAL SERVICES LIMITED, Dublin (IE)

(72) Inventors: John F. Durocher, Dedham, MA (US); Jamie N. Noris, Charlestown, MA (US); Kevin M. Wasielewski, Brookline, MA (US); Suzette Massie, Frisco, TX (US); Trevor Gruzin, Mosman (AU)

(73) Assignee: Accenture Global Services Limited, Dublin (IE)

( * ) Notice: Subject to any disclaimer, the term of this patent is extended or adjusted under 35 U.S.C. 154(b) by 1165 days.

This patent is subject to a terminal disclaimer.

(21) Appl. No.: 14/281,096

(22) Filed: May 19, 2014

(65) Prior Publication Data

US 2014/0257976 A1   Sep. 11, 2014

Related U.S. Application Data

(63) Continuation of application No. 10/907,841, filed on Apr. 18, 2005, now Pat. No. 8,731,952.

(Continued)

(51) Int. Cl.
*G06Q 30/02* (2012.01)
*G06Q 30/06* (2012.01)
(Continued)

(52) U.S. Cl.
CPC ........... *G06Q 30/0253* (2013.01); *G06F 8/38* (2013.01); *G06Q 10/10* (2013.01); *G06Q 30/0281* (2013.01)

(58) Field of Classification Search
CPC .................................................. G06Q 30/0281
(Continued)

(56) References Cited

U.S. PATENT DOCUMENTS 8,731,952 B2   5/2014   Durocher et al.
2003/0023686 A1   1/2003   Beams et al.
(Continued)

*Primary Examiner* — Jonathan P Ouellette
(74) *Attorney, Agent, or Firm* — Harrity & Harrity, LLP

(57) ABSTRACT

A method and apparatus provides information to enhance at least one of: a sales, a service and an administrative transaction by communicating with a plurality of applications from a group of applications in accordance with rule information and based on at least two of the received: end user identification information, client identification information and transaction type information. In one example, the apparatus includes a rules engine, an application integrator, an integration and presentation module, and an integrated user interface. The rules engine causes the application integrator to communicate with a plurality of applications in accordance with the rule information, and at least two of: the end user identification information, the client identification information, and the transaction type information. The application integrator then generates integrated output information received from the plurality of applications to produce the integrated user interface that includes output from the plurality of applications. Based on end user input, the integrated user interface then provides interactive user response information to the application integrator which passes the interactive user response information to the rules engine. The rules engine then determines which of at least one additional supporting application of available applications to use in a next stage of the transaction, which may be the same as or different applications from the plurality of applications. The application integrator then communicates with the additional supporting applications and accordingly updates the integrated output information on the integrated (Continued)

user interface to include output from the at least one additional supporting application.

20 Claims, 7 Drawing Sheets

Related U.S. Application Data

(60) Provisional application No. 60/573,210, filed on May 21, 2004.

(51) Int. Cl.
*G06Q 10/10* (2012.01)
*G06F 8/38* (2018.01)

(58) Field of Classification Search
USPC .................................................. 705/1.1–912
See application file for complete search history.

(56) References Cited

U.S. PATENT DOCUMENTS

| | | | |
|---|---|---|---|
| 2004/0133487 A1 | 7/2004 | Hanagan et al. | |
| 2004/0151287 A1* | 8/2004 | Bedner ............. | H04M 3/42382 379/88.19 |
| 2004/0162800 A1* | 8/2004 | Reid ....................... | G06Q 30/02 |
| 2004/0162801 A1* | 8/2004 | Reid ....................... | G09B 7/00 |
| 2005/0033588 A1* | 2/2005 | Ruiz ....................... | G06Q 10/06 705/35 |
| 2005/0069123 A1 | 3/2005 | Castro et al. | |
| 2005/0234969 A1* | 10/2005 | Mamou ............. | G06F 17/30563 |
| 2006/0173777 A1 | 8/2006 | Torres et al. | |

\* cited by examiner

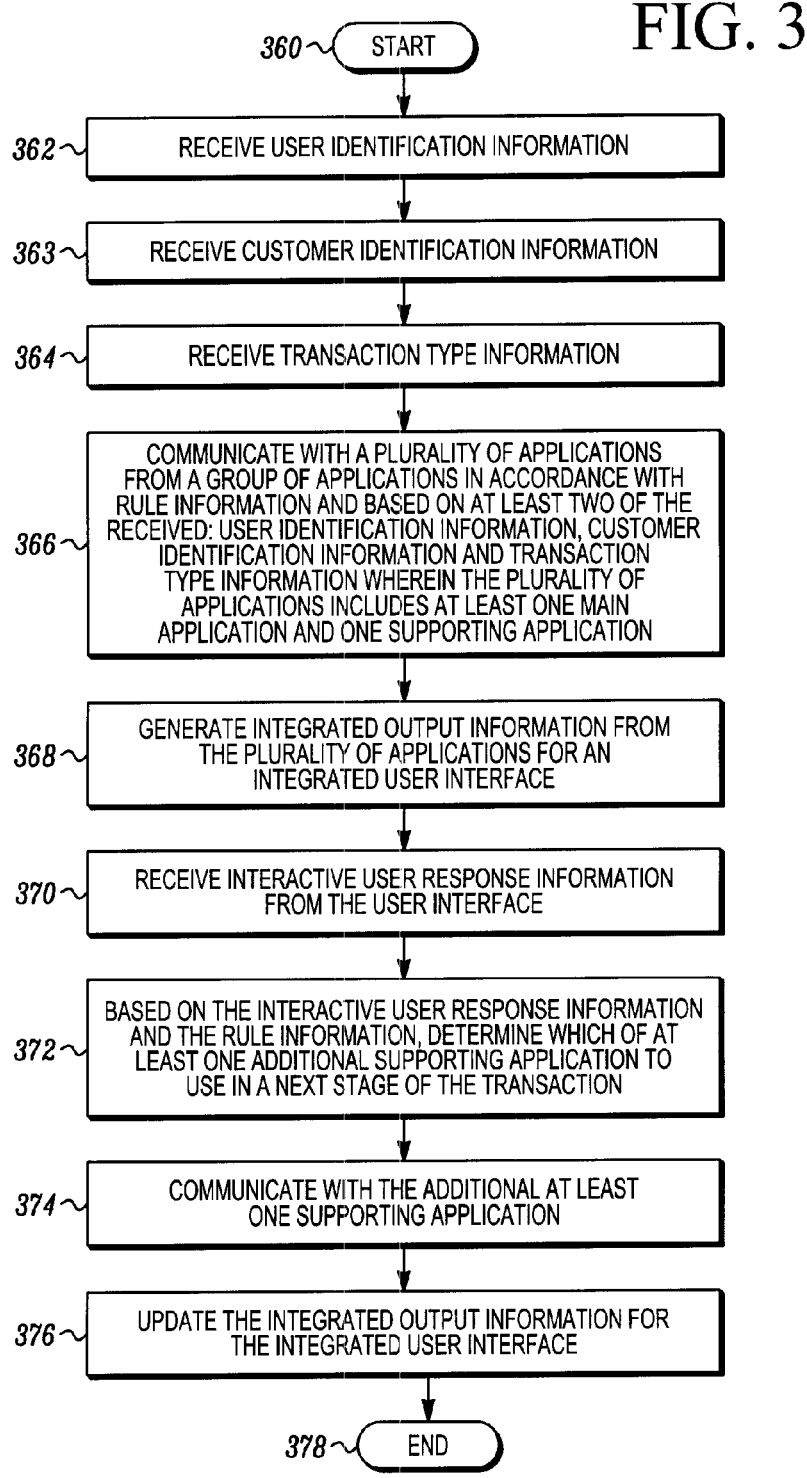

FIG. 5

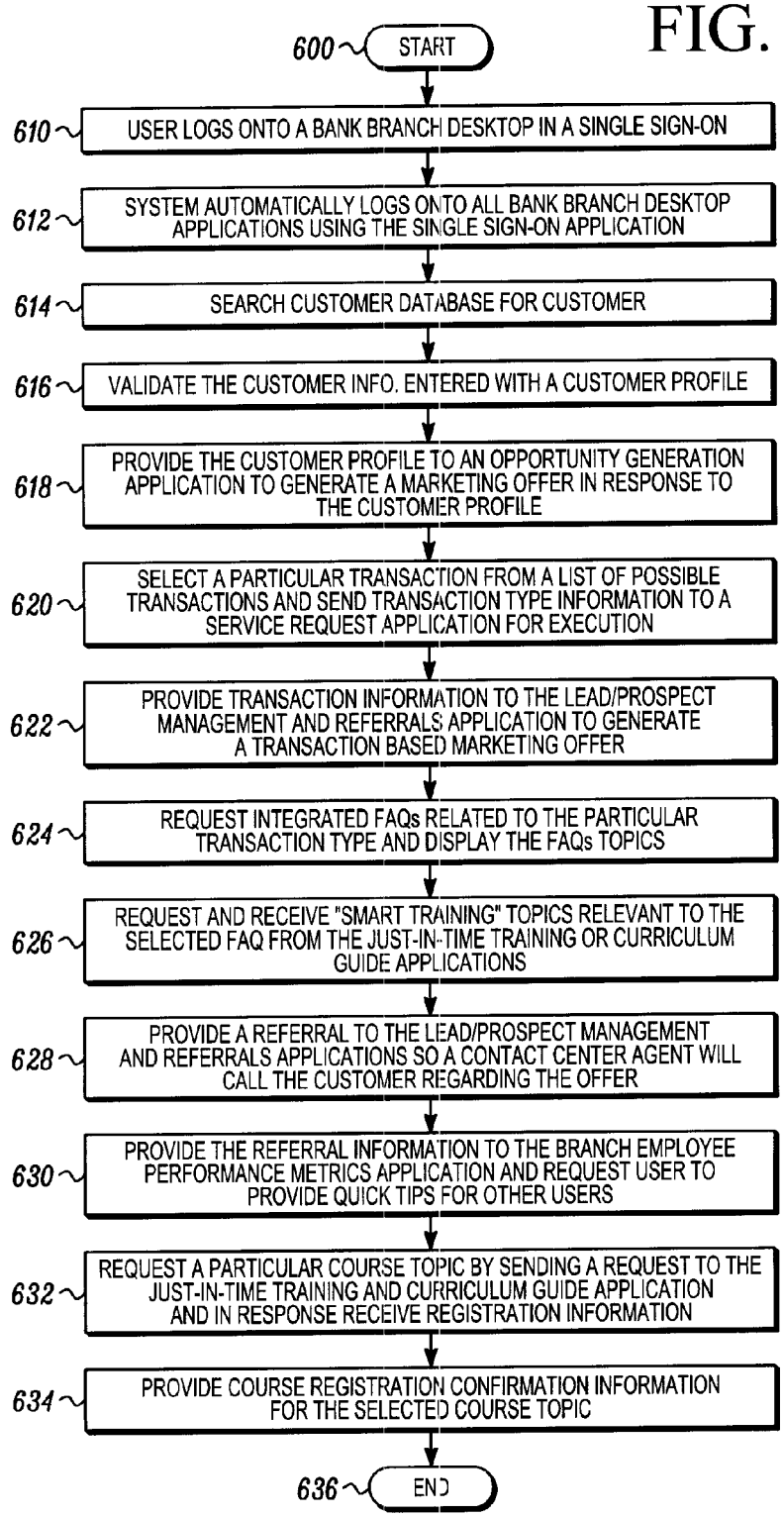

APPARATUS AND METHOD FOR ENHANCING TRANSACTIONS USING RULE INFORMATION TO COMMUNICATE WITH MULTIPLE APPLICATIONS

RELATED APPLICATIONS

This application is a continuation of U.S. patent application Ser. No. 10/907,841, filed Apr. 18, 2005 (now U.S. Pat. No. 8,731,952), which claims priority under 35 C.F.R. § 1.53(c) to U.S. patent application Ser. No. 60/573,210, filed May 21, 2004. The disclosures of which are incorporated by reference herein in their entireties.

This application claim priority to U.S. Ser. No. 60/573,210 entitled "Apparatus And Method For Enhancing Transactions Using Rule Information To Communicate With Multiple Applications" having inventor John F. Durocher et al., filed on May 21, 2004.

FIELD OF THE INVENTION

The present invention relates generally to an apparatus and a method for enhancing transactions and, in particular, an apparatus to enhance transactions by facilitating communication with multiple applications.

BACKGROUND OF THE INVENTION

There is growing demand by service based industries, such as the financial and sales industries, to continually improve both the effectiveness and speed of business transactions. In developing services and/or products to improve the effectiveness and speed of these business transactions, various entities will typically develop specific applications. A user, such as a customer service representative servicing customer transactions, often will have access to a desktop computer or terminal coupled to a network having access to a large number of applications that may support a variety of transactions. Unfortunately, the user is required to navigate a complicated organizational structure of multiple applications to find the desired application. Additionally, since each specific application may be developed by different entities, these applications are often incompatible. As a result, the complexity of the desktop computer may confuse the user, thus degrading the efficiency of the business transaction, resulting in customer dissatisfaction.

In the financial services industry, efforts are now focused on improving bank branch services as a result of customer sentiment, continuous advantages in branch concepts/technology and economics. Many banks seek solutions to provide themselves with a competitive advantage. Accordingly, banks seek to improve their competitive advantage through increased sales by providing consistent, real-time information on an integrated branch user desktop. As a result, the banking industry is experiencing a need to integrate, many off-the-shelf applications which facilitate various aspects of a banking transaction. For example, software applications that are currently available include fraud prevention applications. These fraud prevention applications typically perform customer authentication and fraud detection.

Other examples of off-the-shelf applications include customer relationship management applications, platform and teller, fraud, branch administration, workflow, knowledge management and training applications. The customer relationship management application may include a financial risk profile, a contact history, a customer preference profile, a customer value profitability indicator, a customer life cycle profile forecasting, a segmenting and product mix sub-application. The sales and maintenance application provides real time alerts and offers needs assessments/advice, management of leads and referrals, dispute resolution, and other functions. The financial/internal branch transactions include service request functions, such as check orders and bond redemption, account maintenance and inquiry, payments and transfers and other sub-applications. The branch administration application may include branch/employee performance metrics, sales incentive tracking, scheduling and staffing models and goals/objectives aligned with incentives. The workflow application may include activity management and workflow, check imaging and document imaging as is known in the art. The term workflow is used to describe applications that are developed as business processes. Workflow applications include forms routing and approval, document review and publishing, and issue tracking. Check imaging refers to applications that scan paper checks into electronic images to improve a Banks check items processing by reducing cost and increasing quality and speed of processing.

The knowledge management application includes integrated policy and procedures, product and pricing information, integrated information and alerts, integrated FAQ's, integrated systems help, and universal knowledge base sub-applications. The training application includes a curriculum guide, a scheduling tool, simulation-based content, new hire training, just-in-time training, and process coaching sub-applications. It is known to provide a single log-in to multiple applications that are accessible through a desktop interface. However, this method does not automatically initiate communicate with another group of applications in subsequent stages of a transaction based on a type transaction. As a result, if one application requires information from another application, then the user typically must manually retrieve the information from one application and input it into the other application. Consequently, such methods do not automatically and dynamically obtain information from one application in order to facilitate a transaction on another application even if the information is available in different applications.

It is also known to provide information from different applications on a single user interface screen. However, upon communication with a group of applications, this method does not automatically communicate with another group of applications in subsequent stages of a transaction based on a type transaction. As a result, a user who needs to access data on an application in response to entering data related to a transaction must typically manually interact with the desired application.

According to yet another method, it is known to provide access for multiple financial applications on a desktop computer or terminal. However, such methods do not typically provide a single sign-on for all relevant applications available by the computer or terminal. Further, such methods do not typically automatically execute an application based on a particular type of transaction. For example, if a customer service representative wanted to know if a product or services offering is available for a particular customer based on a particular type of transaction type, the customer service representative would have to manually sign onto a marketing database and manually enter the marketing database to determine if such an offer is actually available based on the type of transaction being executed.

According to yet another known method, it is known to provide a marketing offer based on a specific transaction type. However, such methods do not typically limit access to applications nor execute an application with respect to the role of the user. As a result, such a system may display access to all applications regardless whether the user has access to the applications or not. For example, such a system would allow a bank teller to view administrative and/or management type applications where the bank teller would not have the need or authorization to access such applications.

These problems and other associated problems can impact the performance of a user, such as a bank teller and the customer experience in a particular type of transaction. These problems, for example, may result in long queues and contradictory advice for the customer. One or more of the above-described problems may also result in the branch user and/or customer being forced to fill out multiple forms with the same information. As a result, a customer typically must endure waiting on the phone or long queues while the bank branch user tries to resolve these problems encountered while servicing a customer request.

Accordingly, a need exists for a method and apparatus that addresses one or more of the above issues.

BRIEF DESCRIPTION OF THE DRAWINGS

FIG. 3 is a flow chart illustrating a method for providing information to enhance a transaction in accordance with one embodiment of the invention;

FIG. 5 illustrates one example of an integrated user interface for display in accordance with another embodiment of the present invention; and FIG. 6 is a flow chart illustrating a method for enhancing a transaction according to another embodiment of the invention.

DETAILED DESCRIPTION OF THE PREFERRED EMBODIMENT

A method and apparatus provides information to enhance at least one of: a sales, a service and an administrative transaction by communicating with a plurality of applications from a group of applications in accordance with rule information and based on at least two of the received: end user identification information, client identification information and transaction type information. In one example, the apparatus includes a rules engine, an application integrator, an integration and presentation module, and an integrated user interface. The rules engine causes the application integrator to communicate with a plurality of applications in accordance with the rule information, and at least two of: the end user identification information, the client identification information, and the transaction type information. The application integrator then generates integrated output information received from the plurality of applications to produce the integrated user interface that includes output from the plurality of applications. Based on end user input, the integrated user interface then provides interactive user response information to the application integrator which passes the interactive user response information to the rules engine. The rules engine then determines which of at least one additional supporting application of available applications to use in a next stage of the transaction, which may be the same as or different applications from the plurality of applications. The application integrator then communicates with the additional supporting applications and accordingly updates the integrated output information on the integrated user interface to include output from the at least one additional supporting application.

According to one specific embodiment, a bank branch user desktop interface provides access to nine-key bank branch applications with capabilities and associated subcapabilities, through an interaction-driven integrated user interface. The apparatus and method may support numerous operations, for example, training, teller and platform capabilities combined with insight-driven marketing ("IDM"). For example, insight-driven marketing based applications may use information, such as a customer profile or a business transaction, to provide transaction specific and customer specific marketing offers to the customer in order to stimulate the sale of other banking products and services. According to yet another advantage, all relevant information provided by the various applications is provided in a single level interface to the user. Accordingly, the apparatus and method integrates output from multiple applications to provide the user with a single level portal front end. According to one embodiment, the apparatus may integrate both off-the-shelf applications and custom applications in order to fill an end user's need for access to various capabilities such as training, marketing and sales, administration and transaction capabilities.

Figure 1:
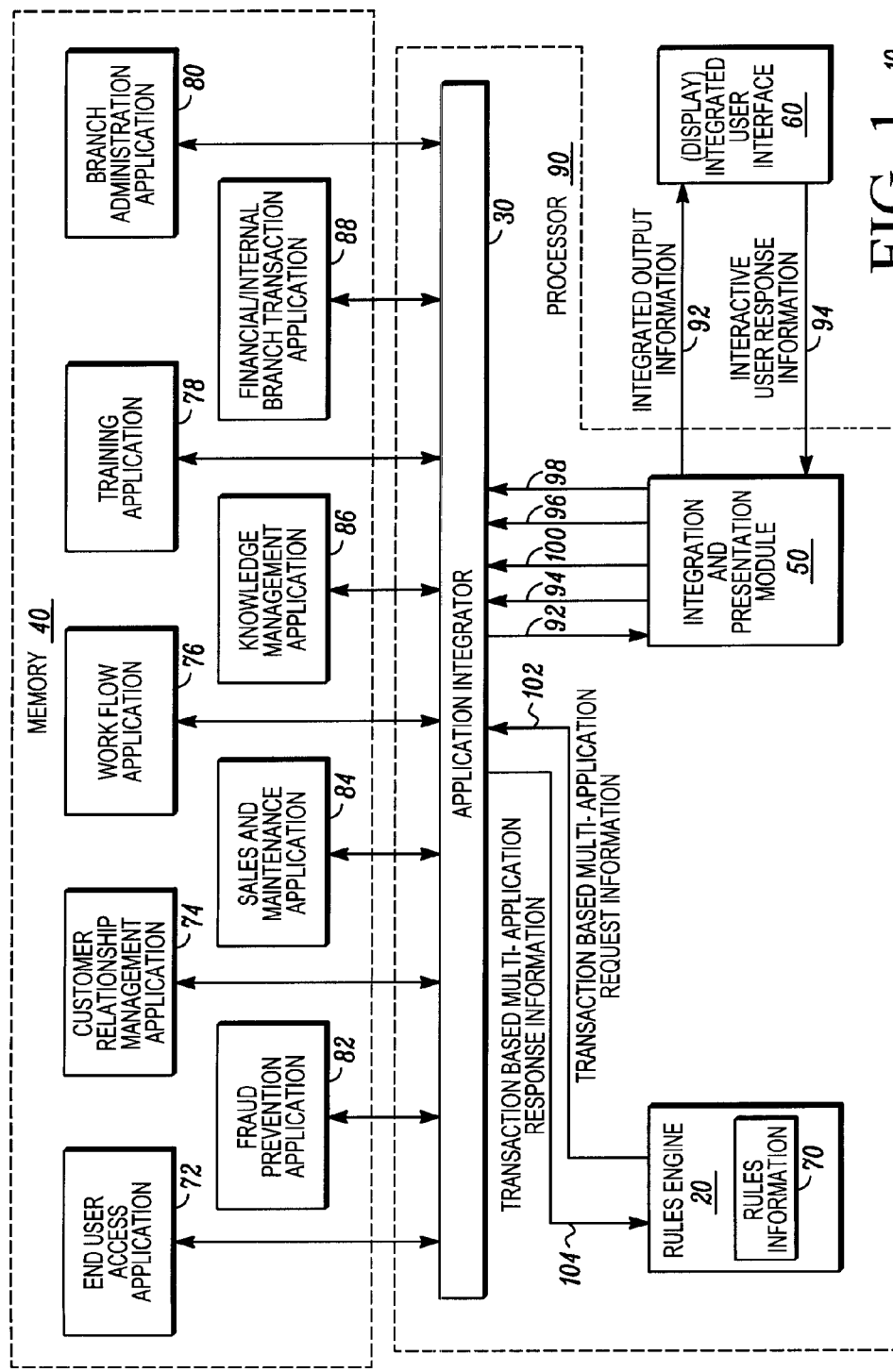
FIG. 1 is a block diagram of an apparatus for enhancing transactions in accordance with the present invention.

FIG. 1 illustrates a block diagram of an apparatus 10 for providing information to enhance at least one of: a sales, a service and an administrative transaction. The apparatus 10 includes one or more processors 90 that functionally include a rules engine 20 and an application integrator 30 and may be a suitable computer or other device. The apparatus 10 also includes memory 40, an integration and presentation module 50, and an integrated user interface 60. The rules engine 20 uses rule information 70 to, for example, determine which applications communication with the application integrator 30. According to one embodiment, the rule information 70, for example, may represent a data structure such as a look up table, instructions and associated database operations or any suitable software programs operating as the rules engine 20. The rules engine 20 may therefore represent one or more suitable software applications capable of carrying out operations based on the rule information 70.

The memory 40 includes multiple applications, for example, a bank branch application 72, a customer relationship management application 74, a workflow application 76, a training application 78, a branch administration application 80, a fraud prevention application 82, a sales and maintenance application 84, a knowledge management application 86 and a financial/internal branch transaction application 88. The memory 40 may include fewer or more applications and sub-applications. For example, the memory 40 may be, a hard disk drive, a distributed disk drive system, random access memory (RAM), read-only memory (ROM), optical memory or any suitable storage-medium located locally or remotely, such as via a server or distributed memory, and may be accessible by a wide area network (WAN), a local area network (LAN), a switching system or any suitable network element via the Internet, a wireless wide access network (WWAN), a wireless local area network (WLAN), such as but not limited to a wireless communication network, an infrared communication network, a satellite communication network or any suitable communication interface or network.

Processor 90 may be one or more suitably programmed processors, such as a microprocessor, a microcontroller or a digital signal processor (DSP), and, therefore, includes associated memory, such as memory 40, which contains instructions that, when executed, causes the processor 90 to carry out the operations described herein. In addition, the processor 90, as used herein, may include discrete logic, state machines or any other suitable combination of hardware, software, middleware and/or firmware. According to one embodiment, the rules engine 20 may be a software program operating on the processor 90 in a computer that is part of a network of computers to perform a variety of functions, among other things, to determine which of the available applications to establish communication with. Similarly, the application integrator 30 may represent a software program or any other suitable software program operating on processor 90 to facilitate communication between the integration and presentation module 50, the integrated user interface 60, the rules engine 20 and the various applications in memory 40. Additionally, the integration and presentation module 50 may represent a software program operating on processor 90. In addition, the rules engine 20, the application integrator 30, the integration and presentation module 50 and the integrated user interface 60 as used herein, can also include discrete logic, state machines or any other suitable combination of hardware, software, and/or firmware.

Figure 2A:
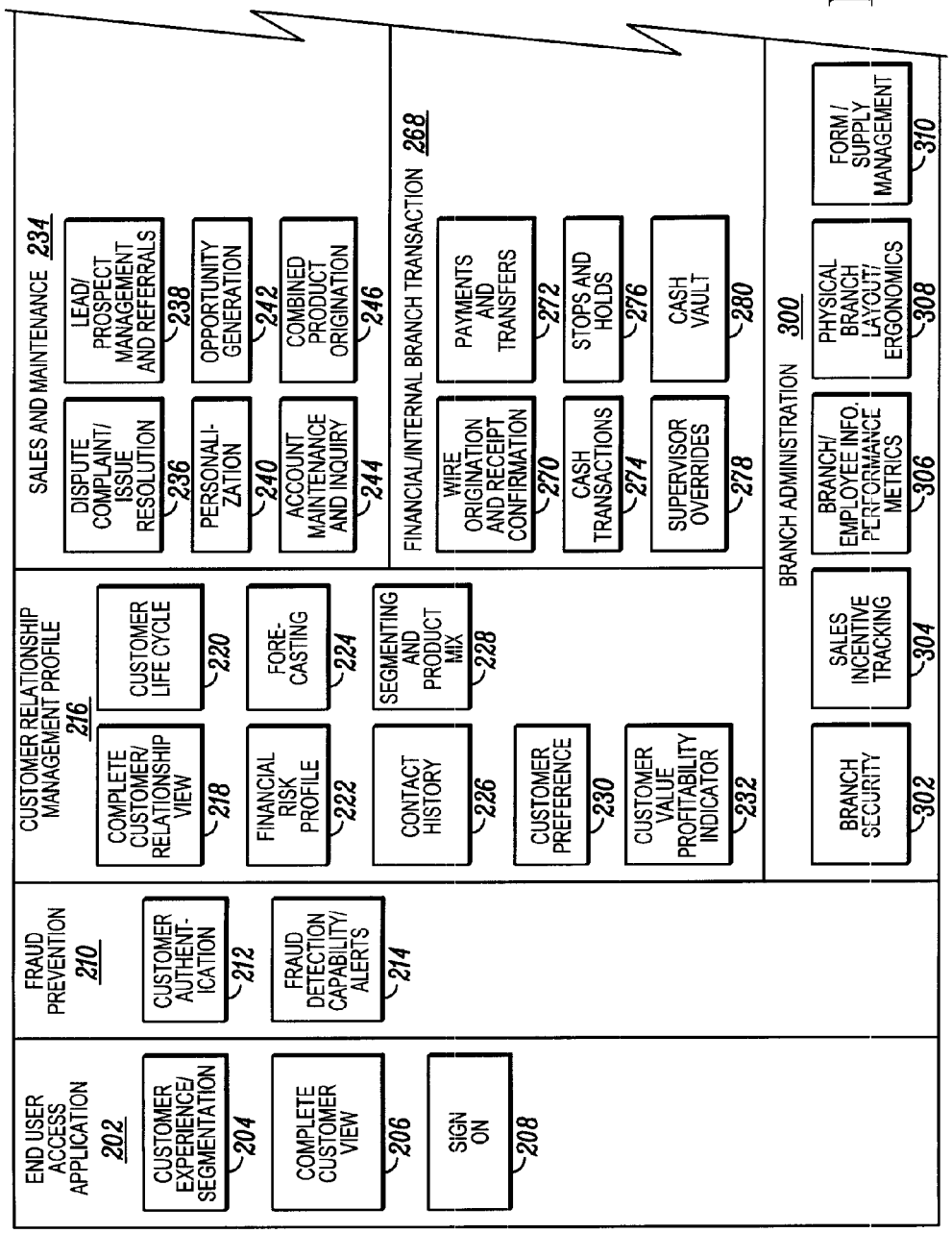
FIGS. 2A and 2B are functional block diagrams illustrating the capabilities of multiple applications and sub-applications in accordance with one embodiment of the present invention.
Figure 2B:
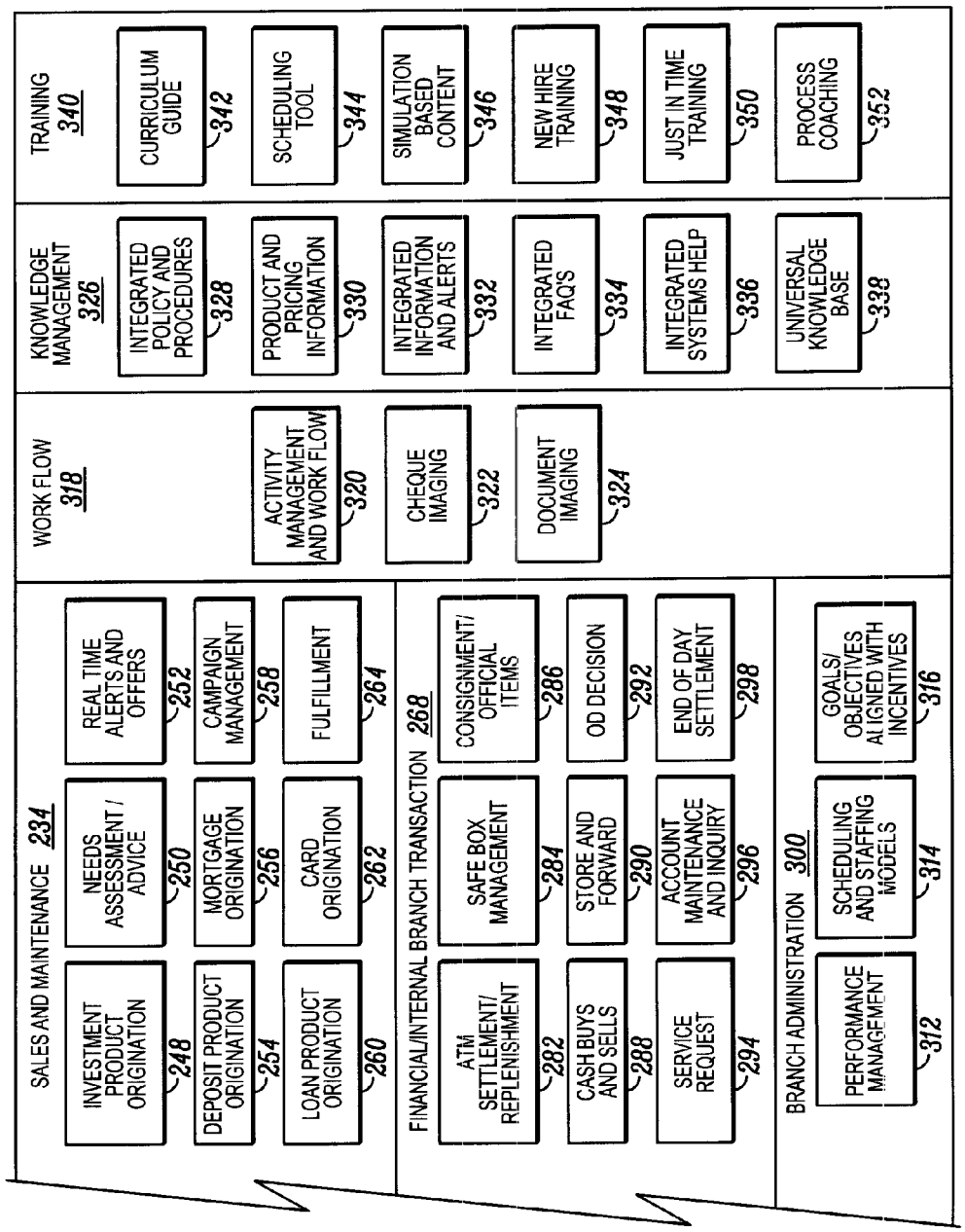

The integrated user interface 60 may be presented on a display for receiving and displaying integrated output information 92. Further, a user may provide interactive user response information 94 to apparatus 10 via the integrated user interface 60. The integrated user interface 60 may be a graphical user interface (GUI), a multifunctional GUI or any suitable user interface. The integrated user interface 60 is integrated in that it is a single level user interface that displays output from a plurality of applications that have been selected for use at a particular stage in the transaction. Therefore, there is no need to toggle between applications because all the information is shown in a single level. FIGS. 2A and 2B illustrate, according to one embodiment, a functional block diagram of a collection of applications and sub-applications 200, organized by main applications, according to one embodiment of the invention. In this example, a bank branch integrated desktop application 202 includes a customer experience/segmentation sub-application 204, a complete customer view sub-application 206 and a single log-on sub-application 208. A fraud prevention application 210 includes a customer authentication sub-application 212 and a fraud detection capability/alert sub-application 214.

A customer relationship management application 216 includes a complete customer relationship view sub-application 218, a customer life cycle sub-application 220, a financial risk profile sub-application 222, a forecasting sub-application 224, a contact history sub-application 226, a segmenting and product mix sub-application 228, a customer preference sub-application 230 and a customer value profitability indicator sub-application 232.

A sales and maintenance application 234 includes a dispute complaint/issue resolution sub-application 236, a lead/prospect management and referrals sub-application 238, a personalization sub-application 240, an opportunity generation sub-application 242, an account maintenance and inquiry sub-application 244, a combined product origination sub-application 246, an investment product organization sub-application 248, a needs assessment/advice sub-application 250, a real time alerts and offers sub-application 252, a deposit product origination sub-application 254, a mortgage origination sub-application 256, a campaign management sub-application 258, a loan product origination sub-application 260, a card origination sub-application 262, and a fulfillment sub-application 264.

A financial/internal branch transaction application 268 includes a wire origination and receipt confirmation sub-application 270, a payment and transfers sub-application 272, a cash transaction sub-application 274, a stops and holds sub-application 276, a supervisor overrides sub-application 278, a cash vault sub-application 280, an ATM settlement replenishment sub-application 282, a safe box management sub-application 284, a consignment/official items sub-application 286, a cash buys and sells sub-application 288, a store and forward sub-application 290, an OD decision sub-application 292, a service request sub-application 294, an account maintenance and inquiry sub-application 296 and an end of day settlement sub-application 298.

A branch administration application 300 includes a branch security sub-application 302, a sales incentive tracking sub-application 304, a branch/employee performance matrix sub-application 306, a physical branch layout ergonomics sub-application 308, a forms/supply management sub-application 310, a performance management sub-application 312, a scheduling and staffing model sub-application 314 and a goals/objectives aligned with incentives sub-application 316. A workflow application 318 includes an activity management and workflow sub-application 320, a cheque imaging sub-application 322 and a document imaging sub-application 324.

A knowledge management application 326 includes an integrated policy and procedures sub-application 328, a product and pricing information sub-application 330, an integration information alerts sub-application 332, an integrated FAQs sub-application 334, an integrated systems help sub-application 336 and a universal knowledge base sub-application 338.

A training application 340 includes a curriculum guide 342, a scheduling tool sub-application 344, a simulation-based content sub-application 346, a new hire training sub-application 348, a just-in-time training sub-application 350 and a process coaching sub-application 352. However, it will be recognized that any suitable application may be used. FIG. 3 illustrates a method for providing information to enhance at least one of: a sales, a service and an administrative transaction. The transaction may be a sales transaction, a service transaction or an administrative transaction. The service transaction may include, for example, a check order, a bond redemption, a wire origination, a cash transaction, a payment, a transfer, a stop and a hold, a withdrawal, a deposit or any other suitable service transaction. The transactions listed would be considered "service" transactions. Examples of sales transactions may include the sale of a new deposit, savings, loan, credit card, investment product or sale of a service related add-on to a new or existing product, such as such as online banking. An administrative transaction may include, for example, monitoring individual employee performance. Other examples of administrative transactions include, monitoring overall branch performance, monitoring branch activity including security, monitoring traffic flow, monitoring teller lines, managing stock of forms, revising marketing materials, and other supplies, or any other suitable administrative transaction.

The method of FIG. 3 may be carried out by the rules engine 20 and the application integrator 30 described with respect to FIG. 1. However, any other suitable structure may also be used. It will be recognized that the method of FIG. 3, beginning with step 360, will be described as a series of operations, but the operations may be performed in any suitable order and may be repeated in any suitable combination.

As shown in step 362, the rules engine 20 receives end user identification information 96 via the integration and presentation module 50 and the application integrator 30. For example, a user operating the integrated user interface 60 such as a bank branch user interface, may log onto the apparatus 10 by providing the user's end user identification information 96 (e.g. login and password) to the rules engine 10 via the application integrator 30. In response, the application integrator 30 in conjunction with the rules engine 20 provides the login information to a single sign-on sub-application 208. Additionally, the application integrator 30 in conjunction with the rules engine 20 provides the end user identification information 96 to the branch/employee information and performance metrics application 306. In response, the branch/employee information and performance metrics application 306 provides user profile information associated with the provided end user identification information 96 to the rules engine 20 via the application integrator 30. For example, the user profile information includes role information associated with the end user identification information 96. The role information indicates the applications available for access by the user. Accordingly, in response to receiving the role information, the rules engine 20 determines which applications and sub-applications the user has access to and causes the application integrator 30 to communication with those identified applications and sub-applications.

For example, if a bank teller logs into the bank branch user interface then, in response to receiving the role information, the rules engine 20 may cause the application integrator 30 to automatically log into the integrated FAQs application 334 to retrieve FAQs information generally related to the user's role as a bank teller. In response, the rules engine 20 may provide the FAQs information to the integrated user interface 60 via the application integrator 30 and the integration and presentation module 50 for display to the user. Additionally, in response to receiving the role information, the rules engine 20 may cause the application integrator 30 to automatically log into the training application 340 to retrieve a status of the user's training and the curriculum guide 342 to retrieve curriculum training information associated with a bank teller's role. Further, the rules engine 20, via the application integrator 30, may transmit the user information 96 to the branch administration application 300 and to, for example, the branch/employee performance metrics sub-application 306. In response, the branch/employee performance metrics application 306 may provide to the rules engine 20, via the application integrator 30, a list of courses that the user has taken. In response, the rules engine 20 may compare the status of the user's training with the curriculum training information to determine if the user has not taken a course in the curriculum. If the user has not taken a course in the curriculum, the rules engine 20 sends suggested training information to the integrated user interface 60 via the application integrator 30 and the integration and presentation module 50 for display to the user.

Since the rules engine 20 determines which group of applications it will communicate with from the group of available applications, the rules engine 20 only logs onto those applications for which the rules engine 20 will be accessing. For example, if a manger logs in, then the manager will be allowed access to specific applications, such as the branch/employee performance metrics sub-application 306 to conduct an employee performance review. However, if a teller logs in, then the teller will only be allowed access to applications suitable for the teller's needs. According to one alternative embodiment, the rules engine 20 logs into all available applications in response to the user providing the end user identification information and also in response to communicating with the plurality of applications from the group of applications. As a result, the user automatically logs into all available applications within the group in response to providing a login and password. As shown in step 363, the user, such as a bank teller, may provide client identification information 98 in response to a customer requesting service from the bank teller. For example, a client, such as a bank customer, may produce an identification or bank transaction card, such as an ATM (Automated Teller Machine) card, for customer identity authorization. The rules engine 20 receives and recognizes the interactive user response information 94 as, for example, the client identification information 98, and via the application integrator 30, provides the client identification information 98 to the complete customer view sub-application 206 and the account maintenance and inquiry sub-application 296. For example, the rule information may represent a database including a list of transaction type information, such as an authorization of client information 98, and corresponding application identification associated with each transaction type information 100 (i.e. request for client information authorization). In response to the request for authorization of the client information 98, the rules engine 20 sends the request for client information authorization to the complete customer/relationship view sub-application 218 and the account maintenance and inquiry sub-application 296 to obtain the customer profile and account information according to the application identification identified in the database. In response, the rules engine 20 may then provide the customer profile and account information to the integrated user interface 60 in order to allow the user to review the customer profile and account information.

According to an alternative embodiment, the rules engine 20 may maintain and store the customer profile and account information during the transaction in the event any other application requires and requests the customer profile and account information. For example, the rules engine 20, based on the rules information 70, may automatically forward to, for example, the sales and maintenance application 234, the customer profile and account information relevant to the transaction. In response, the sales and maintenance application 234 provides the customer profile and account information to the account maintenance and inquiry sub-application 244, real time alerts and offers sub-application 252 and the opportunity generation sub-application 242. According to one embodiment, the sales and maintenance sub-application 234 receives information, such as the customer profile and account information, and automatically stores the information in the account maintenance and inquiry sub-application 244 and also automatically forwards the information to the opportunity generation sub-application 242 and the real time alerts and offers sub-application 252. As such, the rules engine 20 may be programmed via the rules information 70 to send the transaction-based multi-application request information 102 to the sales and maintenance sub-application 234 for distribution to other sub-applications, such as the account maintenance and inquiry sub-application 244, the opportunity generation sub-application 242, the lead/prospect management and referrals sub-application 238 and the real time alerts and offers sub-application 252. Alternatively, the rules engine 20 may transmit the customer profile and account information directly to the account maintenance and inquiry sub-application 244, the opportunity generation sub-application 242, the real time alerts and offers sub-application 252 and the lead prospect management and referrals sub-application 238.

According to an alternative embodiment, applications written by the same vendor and already integrated within another application may actually transmit information directly between the sub-applications. Otherwise, the rules engine 20 and the application integrator 30 may route or direct information from one sub-application to another sub-application, such as where the different sub-applications were not developed by the same vendor or are otherwise not integrated to support the exchange of information. As a result, the rules engine 20 and the corresponding rules information 70 may be programmed with knowledge of which applications and which sub-applications are fully integrated, which applications are integrated to permit the exchange of information, such as customer profile and account information, and which applications are not integrated and require the exchange of information via the application integrator 30 and the rules engine 20.

According to one embodiment, the rules engine 20 receives a customer-based marketing offer via the application integrator 30 from the sales and maintenance application as a result of the analysis performed by the real time alerts and offers sub-application 252, the opportunity generation sub-application 242 and the account maintenance and inquiry sub-application 244. Such a marketing offer is described herein as customer-based marketing offer because the offer was based on an analysis of the customer profile and account information as opposed to being based on a particular transaction.

As shown in step 364, the user provides to the rules engine 20 transaction type information 100. For example, the transaction may be a service request, such as a check order, bond redemption, a wire origination and receipt confirmation, a cash transaction, an account maintenance and inquiry or any other suitable transaction. For example, the rules engine 20 may provide the transaction type information 100 as transaction-based multi-application request information 102 to the financial/internal branch transaction application 268 via the application integrator 30. In turn, the financial/internal branch transaction application 268 may provide the transaction type information to the service request application 294 for processing and further execution.

As shown in step 366, the rules engine 20, based on the rule information 70, communicates with a first group of applications, such as a plurality of applications wherein the plurality of applications includes at least one main application and at least one supporting application, from a group of available applications in accordance with rule information 70 and also based on at least two of the received: the end user identification information 96, the customer identification 98 and the transaction type information 100. The group of applications may be those as previously described with respect to FIG. 2.

According to one embodiment, the rules engine 20 may provide, via the application integrator 30, the transaction type information 100 as transaction-based multi-application request information 102 to the (main) service request application (294) and the (supporting) sales and maintenance application 234 to perform an analysis by the real time alerts and offers sub-application 252, the opportunity generation sub-application 242 and the account maintenance and inquiry sub-application 244. In response, the rules engine 20, via the application integrator 30, receives a transaction-based marketing offer from the sales and maintenance application 234 as a result of the analysis performed by the real time alerts and offers sub-application 252, the opportunity generation sub-application 242 and the account maintenance and inquiry sub-application 244. Such a marketing offer is described herein as a transaction-based marketing offer because the offer was based on an analysis of a particular transaction.

As shown in step 368, the rules engine 20 causes the integration and presentation module 50 to generate integrated output information 92 from the first group of applications to produce the integrated user interface 60 that includes output from the plurality of applications. For example, an application may provide a marketing offer or general FAQs depending on the type of transaction, the user information or customer information.

According to one embodiment the rules engine 20 forwards the transaction type information 100 to the (supporting) customer relationship management application 216, the financial/internal branch transaction sub-application 268 and the sales and maintenance sub-application 234. For example, the opportunity generation sub-application 242 and the real time alerts and offers sub-application 252 may recognize a marketing opportunity based on insight-driven marketing and produce a marketing offer related to the transaction type information 100.

According to another embodiment, in response to receiving the transaction type, the rules engine 20 may cause the application integrator 30 to automatically log into the (supporting) integrated FAQs application 334 to retrieve FAQs information generally related to the transaction type information 100. In response, the rules engine 20 may provide the FAQs information to the integrated user interface 60 via the application integrator 30 and the integration and presentation module 50 for display to the user. Additionally, in response to receiving the role information, the rules engine 20 may cause the application integrator 30 to automatically log into the training application 340 to retrieve a status of the curriculum guide 342 to retrieve curriculum training information associated with a list of courses with regard to the transaction type information 100. Further, the rules engine 20, via the application integrator 30, may transmit the transaction type information 100 to the branch administration application 300 and to, for example, the branch/employee performance metrics sub-application 306. In response, the branch/employee performance metrics application 306 may provide to the rules engine 20, via the application integrator 30, a list of courses that the user has taken. In response, the rules engine 20 may compare the status of the user's training with the curriculum training information to determine if the user has not taken a course in the curriculum. If the user has not taken a course in the curriculum, the rules engine 20 sends suggested training information to the integrated user interface 60 via the application integrator 30 and the integration and presentation module 50 for display to the user.

According to one embodiment, the integration and presentation module 50 integrates the marketing offer information, the general FAQ information, the client information and the transaction information on a single screen for display on the integrated user interface 60. As a result, the user may be able to quickly locate desired information because the information is associated with a particular location on the screen and, therefore, may be easily and quickly found.

As shown in step 370, the rules engine 20 receives via the integration and presentation module 50 and the application integrator 30, interactive user response information 94 from the integrated user interface 60 in response to displaying the integrated output information 92. According to one embodiment, the interactive user response information 94 may be, for example, a marketing referral or request for a specific FAQ topic. Returning to the marketing offer example, the rules engine 20 directs the application integrator 30 to forward the marketing offer received from the real time alerts and offers sub-application 252 and provide the integrated output information 92 to the integration and presentation module 50. In response, the integration and presentation module 50 provides the integrated output information 92 to the integrated user interface 60 to display the marketing offer to the user.

Returning to the training example, the rules engine 20 receives a request for a specific FAQ topic or training course, as appropriate, from the integrated user interface 60 via the integration and presentation module 50. In response, the rules engine 20 provides the request for a specific FAQ topic to the integrated FAQs sub-application 334 or provides the course training information to the curriculum guide 342 or the scheduling tool application 344.

Returning to the marketing example, the integrated user interface 60 provides interactive user response information 94 regarding the marketing offer to the integration and presentation module 50. In response, the integration and presentation module 50 provides the interactive user response information 94 to the rules engine 20 via the application integrator 30. Accordingly, the rules engine 20 causes the application integrator 30 to forward the marketing request to the appropriate application, such as the lead/prospect management and referrals application 238.

As shown in step 372, the rules engine 20 determines which of at least one additional supporting application of the group of applications to use in a next stage of the transaction based on the interactive user response information 94 and the rule information 70. The at least one additional supporting application may be the same or different applications from the plurality of applications. For example, the rules engine 20 may cause the application integrator 30 to direct a user's request for a marketing referral to the lead/prospect management and referrals sub-application 238 and a request for a FAQ topic to the integrated FAQs sub-application 334 as supporting applications. Accordingly, the at least one additional supporting application may refer to a supporting application that is the same as the plurality of applications but the at least one additional supporting application may also refer to the same or different sub-applications than those referred to with respect to the plurality of main and supporting applications.

Returning to the marketing offer example, the rules engine 20 determines which of the at least one supporting applications, such as the sales and maintenance application 234, to use in the next stage of the transaction. For example, the rules engine 20 may cause the application integrator 30 to forward the request for the referral in step 370 to the lead/prospect management and referrals sub-application 238 for logging of the referral. For example, a referral may note that a representative contact the client at his home office in order to discuss the details of the marketing offer.

Returning to training example, the rules engine 20 may determine which of the supporting application, such as the training application 340, knowledge management application 326 and branch administration application 300 to use. For example, the rules engine 20 may cause the application integrator 30 to direct a request for a specific FAQ to the just-in-time training sub-application 350 to recommend a particular course suitable for the user in response to the user's request for particular information regarding the selected FAQ. According to one embodiment, the rules engine 20 prompts the just-in-time training sub-application 350 and the branch employee performance metrics sub-application, and compares the recommended list of courses with a list of courses already taken by the user. In addition, the rules engine 20 sends a message via the application integrator to prompt the analysis of the user's performance via the branch employee performance metrics sub-application 306 along with the requested information in order to determine whether the employee is performing at an appropriate level. For example, if the employee is ranked at the top of the employee's class, then there is less of a need to provide basic training to the employee; however, if the user is requesting basic information that the user should either know or should have learned in a previous training course, then additional or supplemental training may be suggested.

According to yet another embodiment, the branch/employee performance metrics application 306 may track the number of leads provided to the lead/prospect management and referrals application 238 and perform an analysis to determine whether the user is particularly successful at providing a business referral. In response, the rules engine 20 may send a message via the application integrator 30 to the user to provide tips for improving performance of other users with respect to increasing their levels of business referrals. In response, the rules engine 20 through the application integrated 30 may forward the tips to the universal knowledge base sub-application 338.

As shown in step 374, the rules engine 20 communicates with the additional supporting applications via the application integrator 30. The additional supporting applications were identified in step 372. Accordingly, the rules engine 20 provides transaction-based multi-application request information 102 to the application integrator 30 in accordance with the request. The application integrator 30 directs the request to the appropriate application.

Returning to the marketing offer example, the rules engine 20 may determine that the referral information should be routed to, for example, the lead/prospect management and referrals sub-application 238 and the opportunity generation application 242. As such, the rules engine 20 cause the application integrator to communicate with either the same applications previously communicated with or different applications, depending on the requested information from the user and the information requested from the applications. The rules engine 20 dynamically causes the application integrator 30 to communicate both with the applications and with the user as needed in order to facilitate the processing of information to enhance the transaction.

Returning to the training example, the rules engine 20 may cause the application integrator 30 to communicate with any of the training applications 340, the knowledge management application 326 and the branch administration application 300. As previously discussed with the regard to step 372, the rules engine 20 may cause the application integrator 30 to forward the request for training to the curriculum guide application 342 or the scheduling tool application 344, and may additionally provide the request for training to the branch/employee performance metrics sub-application 306 to keep track of the user's training courses. Further, as previously discussed, the integrated universal knowledge base 338 may request that the user provide some top tips for inclusion into the integrated FAQs sub-application 334, so that other users may benefit from the experience and success of the user providing product and service referrals.

As shown in step 376, the rules engine 20 causes the application integrator 30 to update the integrated output information 92 to include output from the at least one additional supporting application for display on the integrated user interface 60. For example, the additional supporting applications identified in step 372 may provide transaction-based multi-application response information 104 to the rules engine 20 via the application integrator 30. Then the application integrator 30 may then provide integrated output information 92 for display on the integration and presentation module 50. As previously stated, the integration and presentation module 50 combines the integrated output information 92 to include output from the additional supporting applications for display at a single level. Furthermore, according to another embodiment, the integration and presentation module 50 places specific information, such as FAQs information, training information or any other suitable information, at a particular portion of the display. As such, the user may quickly identify frequently accessed types of information since the information is consistently located on a particular portion of the screen.

Figure 4:
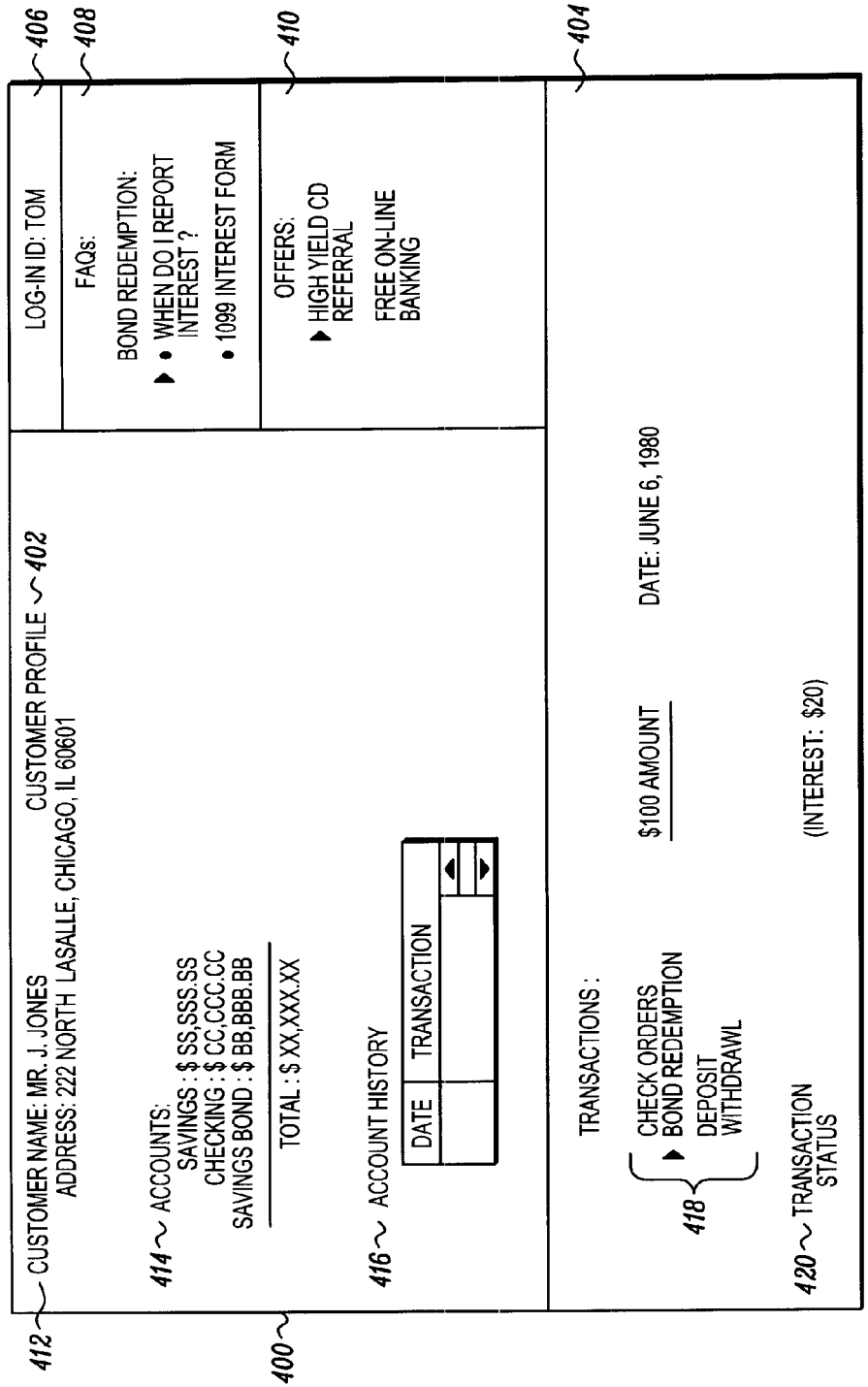
FIG. 4 illustrates an example of an integrated user interface in accordance with one embodiment of the present invention.

FIG. 4 illustrates a user interface screen 400 for the integrated user interface 60 in accordance with one embodiment of the present invention. The user interface 400 includes a customer profile portion 402, a transaction portion 404, a log-in ID portion 406, a FAQ section 408 and a marketing offer portion 410. The customer profile section 402 includes a customer name 412, an account summary 414 and an account history 416. The transaction portion 404 includes a list of transaction options 418 and a transaction status 420. According to one embodiment, the user interface 400 is a single screen interface such that the customer profile 402, the transaction portion 404, the log-in ID portion 406, the FAQs and the marketing offer portion 410 are all displayed on a single screen.

Figure 5:
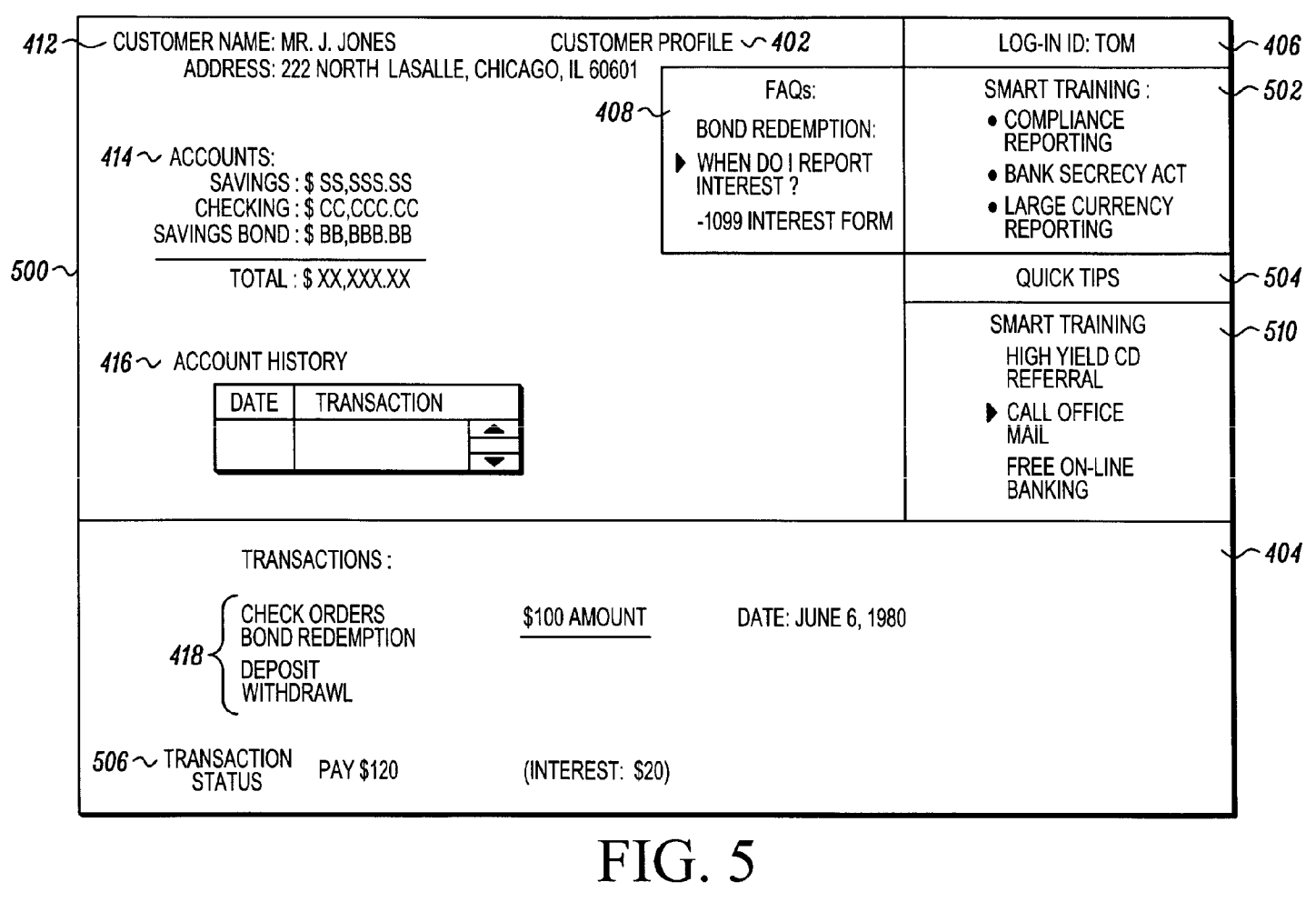

FIG. 5 illustrates a user interface screen 500 that is updated from the user interface 400 described in FIG. 4. The updated user interface 500 further includes a smart training portion 502, a quick tips portion 504 and a transaction status portion 506.

FIG. 6 is a flow chart illustrating one example of a financial transaction executed between a bank teller and a customer. The method of FIG. 6 may be carried out by the rules engine 20 in conjunction with the application integrator 30 described with respect to FIG. 1. However, any other suitable structure may also be used. It will be recognized that the method of FIG. 6, beginning with step 600, will be described as a series of operations, but the operations may be performed in any suitable order and may be repeated in any suitable combination.

Each step of the method example of FIG. 6 will be described in the context of a transaction between a customer, Mr. Jones, and a teller, Tom. Mr. Jones approaches the teller counter and requests to have his savings bond cashed. He hands the bond over the counter to teller Tom. Teller Tom has just returned from lunch and is not yet logged onto his desktop. He greets Mr. Jones, carefully reviews the bond and asks Mr. Jones for his driver's license.

As shown in step 610, teller Tom enters his bank branch system with his identification and password in a single sign-on procedure. As was described before, the single sign-on procedure includes automatically logging onto all necessary applications as defined by the rule engine 20.

As shown in step 612, the rules engine 20 causes the application integrator 30 to automatically log onto all relevant bank branch desktop applications as designated by Tom's role as a teller, using the single sign-on procedure and in accordance with the user identification information (indicates Tom's role) previously described with respect to step 362.

As shown in step 614, the bank branch desktop application searches for Mr. Jones in the customer database as previously discussed at step 363. For example, the rules information 70, programmed in the rules engine 20, may direct the application integrator 30 to forward the customer name and/or account information to the customer authentication sub-application 212 in the fraud prevention application 210 and the complete customer relationship view sub-application 218 in the customer relationship management application 216. As such, application integrator 20 may automatically route customer name information entered in the customer name field 412 of the customer profile portion 402 of integrated user interface 400.

As shown in step 616 customer authentication application 212 validates the customer information entered with the customer profile information received via the application integrator 30 and the complete customer relationship view sub-application 218, as previously discussed also at step 363. According to one embodiment, the customer authentication sub-application 212 may receive the customer name information 412 entered in the customer profile 402 of the integrated user interface 400 and compare the customer name with the customer profile on file. As a result of the comparison, the customer authentication application 212 may then provide a response via the application integrator 30 to integrated user interface 400 indicating that the customer name is validated and the customer is authorized to conduct a transaction. Teller Tom validates the name and address information received from the customer authentication application 212 and quickly reviews the customer's profile information that is presented in the integrated user interface. Teller Tom sees that Mr. Jones has additional savings bonds as well as investment and deposit accounts totaling $150,000.

As shown in step 618, based on rule information linking the outputting of customer profile information with a marketing offering, the rules engine 20 causes the application integrator 30 to provide the customer profile information to an opportunity generation sub-application 242 to generate a marketing offer in cooperation with real time alerts and offers sub-application 252 in response to receiving the customer profile. According to this example, the marketing offer is an offer for free online banking shown in the integrated user interface 60. According to this example, the offer for free online banking is in response to a review of the customer profile and may therefore be referred to as a customer-based marketing offer. This is also an example of insight-driven marketing.

As shown in step 620, teller Tom selects a particular transaction from a list of possible transactions that were presented in the integrated user interface 60 based on a login rule as desired that caused the financial branch transaction application 268, to execute and present a list of all relevant transactions that may be carried out. Tom selects the desired transaction to conduct by selecting (e.g., activation a GUI button or other interface operation) transaction type information 100 to activate, in this example, the service request sub-application 294 for execution. According to this example, teller Tom selects bond redemption from the transaction options 418 listed in the transactions portion 404 of the integrated user interface 400 and enters the date of the bond (Jun. 6, 1980) and the amount ($100), as shown in the transaction portion 404. The bond redemption transaction corresponds to the procedure with respect to step 364. The service requesting sub-application 294 is the main application and generates the amount of interest owed to the customer of $20, as shown in the transaction portion 404.

As shown in step 622, based on a rule that takes into account the transaction type, a supporting application is called. In this example, the application integrator 30 provides the transaction type information 100 to the rules engine 20 and the rules engine 20 notifies the application integrator 30 to communicate with the real time alerts and offers sub-application 252 as a supporting application to generate a transaction-based marketing offer as previously described with respect to step 366. The real time alerts and offers sub-application 252 outputs the new marketing offer for a high-yield CD (Certificate of Deposit), based on the transaction Tom performs. For example, the application integrator 30 forwards the transaction type information 100 directly to the opportunity generation sub-application 242 or real time alerts and offers sub-application 252 so that it can determine whether to generate a transaction-based marketing offer in cooperation with the real time alerts and offers sub-application 252 in response to receiving the transaction information. The opportunity generation sub-application 242 generates the transaction based marketing offer and in response, the application integrator 30 conveys the offer as integrated output information 92 for display with the response from the service request application 294 (upon processing the transaction request) via the integration and presentation module 50 and in turn to the integrated user interface 60 for display. Tom quickly reviews the offer details and the bond transaction response from the service request application 294 and decides that he will present it to Mr. Jones after he has completed the transaction.

Tom knows that he needs to report interest over a certain amount, but cannot remember how much. He navigates to the side of his integrated user interface screen 400 where the integrated FAQs application 334 has provided a list of frequently asked question topics based on transaction type information 100. One of the frequently asked question topics relevant to the bond redemption transaction is "When do I report interest?" As shown in step 624 and also as previously discussed at step 368, the rules engine 20 causes the application integrator 30 to provide the transaction type information 100 to the integrated FAQs sub-application 334 and in response, the integrated FAQs sub-application 334 provides a list of FAQ topics as integrated output information 92 to the integrated user interface 60. At this point, the user interface screen 400 shown in FIG. 4 represents the state of the screen. Subsequent changes to the screen will be shown as indicated in FIG. 5.

Tom clicks on "When do I report interest?." In response, the integrated user interface 60 generates interactive user response information 94 representing the FAQ request as previously described with respect to step 370 and the rules engine 20 causes the application integrator 30 to select (as previously described with respect to step 372) and communicates the FAQ request to the integrated FAQs application 334 as previously described with respect to step 374. The integrated FAQs sub-application 334 responds with the requested FAQ information, and the rules engine 20 directs the application integrator 30 to forward the requested FAQ information to the integrated user interface 60 via the integration and presentation module 50 as previously discussed with respect to step 376. The requested FAQ information is displayed in the FAQ portion 408 of the updated user interface screen 500 and is therefore integrated with the other data in the user interface screen 500, such as the transaction options information 418. He quickly learns that interest over $10 must be reported. Since it has been a while since Tom executed this process, he is happy to see a link to the 1099 form in the FAQs section 408 and the process to complete it. Tom is relieved that he does not have to call for help and keep Mr. Jones waiting. Tom completes the 1099 form.

As shown in step 626, the rules engine 20 causes the application integrator 30 to communicate with at least one supporting application, such as the just-in-time training sub-application 350 or curriculum guide sub-application 342 to request and receive "smart training" topics in response to the user selecting the FAQ topic and the rule information 70. This process was also previously described with respect to the training example in step 376. The rule information 70 may indicate that in response to receiving a selected FAQ topic, the rules engine 20 requests training information related to the selected FAQ topic from the just-in-time training sub-application 350 or curriculum guide sub-application 342. As shown in FIG. 5, the smart training portion 502 of the user interface screen 500 illustrates the smart training topics received by the rules engine 20. Since the smart training was produced in response to Tom selecting a particular FAQ, namely "When do I report interest?", the FAQs section 408 is maintained on the screen in order to facilitate future reference to other frequently asked questions for the convenience of the user. As a result, the user interface screen 500 provides all information to the user in at a single level of the integrated user interface. This is also an example of the rules engine 20 causing the application integrator 30 to communicate with at least one other supporting application, the just in time training sub-application 350 in response to the interactive user response information 94 and the rule information 70.

Mr. Jones completes the form and returns it to Tom. The account maintenance and inquiry sub-application 296 determines that Tom pay the customer $120. He pays Mr. Jones $120 in cash and extends the marketing offer for a high-yield CD. Mr. Jones is interested in hearing more about the high-yield CD, but informs Tom that he needs to run to another appointment. Tom then asks Mr. Jones if he would like someone to phone him later that day to provide further information. Mr. Jones agrees. As shown in step 628, Tom enters a referral request to the integrated user interface 60, and in response the integration and presentation module 50 and the application integrator 30 provide the referral request to the rules engine 20. In response, the rule information 70 instructs the rules engine 20 to cause the application integrator 30 to forward the referral request to the lead/prospect management and referrals sub-application 238 (main application), so a contact center agent will call the customer regarding the offer at his office this afternoon. Tom thanks Mr. Jones for his business.

As shown in step 630, the rule information 70 instructs the rules engine 20 to cause the application integrator to also instructs the rules engine 20 to provide the referral information to the branch employee performance metrics sub-application 306. Based on the referral information, the branch employee performance metrics application 306 recognizes that Tom is the leading teller referral provider in the region. The branch employee performance metrics sub-application 306 (supporting application) provides a message indicating that Tom has just become the leading teller referral provider in the region to the rules engine 20. In response, the rules engine 20 causes the application integrator 30 to send a message to the universal knowledge base sub-application 338 (supporting application) indicating that teller Tom is the leading teller referral provider in the region.

In response to receiving a message that Tom is the leading teller referral provider in the region, the rules information 70 instructs the rules engine 20, through the application integrator 30 to request from Tom his "quick tips" for his techniques and ideas to enable other tellers to learn from his experiences. In response to receiving Tom's quick tips, the rules engine 20 causes the application integrator 30 to provide Tom's quick tips to the universal knowledge base 338 (supporting application). Tom's quick tips may then be provided in the quick tips portion 504 of the updated user interface screen 500. Since there are no other customers waiting, he reviews the smart training portion 502 of the updated user interface screen 500, which includes 30-minute online courses for compliance reporting, the Bank Secrecy Act and large currency reporting. As shown in step 632, Tom agrees that he needs to further his compliance reporting knowledge and requests a particular course topic by sending a request to the just in time training sub-application 350 and curriculum guide sub-application 342.

As shown in step 634, in response to Tom's request for compliance reporting training, the just in time training sub-application 350 (supporting application) sends a confirmation message to the application integrator 30 and in turn, the rules engine 20 provides the confirmation message to the integrated user interface 60 confirming Tom's course registration. Accordingly, the smart training portion 502 of the updated user interface screen 500 is further updated to indicate the course registration confirmation information.

Although the transaction-based marketing offer is described above as integrated in an example with other activities occurring, such as training, a method and system will be described for providing the transaction-based marketing offer according to one embodiment. As previously described with respect to FIG. 3, the rules engine 20 receives the end user identification information 96, the client identification information 98 and the transaction type information 100. In response to receiving the transaction type information 100, the rules engine 20 causes the application integrator 30 to communicate with the real time alert and offers sub-application 252 (main application) and the opportunity generation sub-application 242 (supporting application) to determine whether the transaction type information 100 warrants a marketing offer. For example, in response to receiving any transaction type information 100, the rules engine 20 causes the application integrator 30 to automatically forward the transaction type information 100 to the real time alerts and offers sub-application 252. In response, the real time alerts and offers sub-application 252 determines whether, for example, the customer will receive, as a result of the transaction, a marketing offer.

Further, the real time alerts and offers sub-application 252 may receive customer profile and account information from the account maintenance and inquiry sub-application 244, via the application integrator 50 and as directed by the rules engine 20, in order to determine whether the sufficient cash funds are available, and therefore, warrant investment in a new investment vehicle, such as a high-yield certificate of deposit account. According to one embodiment, the real time alerts and offers sub-application 252 may communicate through the application integrator 30 with the account maintenance and inquiry sub-application 244, or alternatively, the real time alerts and offers sub-application 252 may communicate through the application integrator 30 to request account balance and customer profile information from other applications, such as the account maintenance and inquiry sub-application 296 and the complete customer relationship view sub-application 218. For example, the rules engine 20 may provide the transaction type information 100 as transaction-based multi-application request information 102 to the application integrator 30 for routing and any suitable data format translation to the real time alerts and offers sub-application 252.

If the real time alerts and offers sub-application 252 determines that a transaction-based marketing offer is warranted, then the real time alerts and offers sub-application 252 sends a transaction-based marketing offer to the rules engine 20 via the application integrator 30. In response, the rules engine 20 directs the application integrator 30 to forward the transaction-based marketing offer to the integration and presentation module 50 as integrated output information 92. The integration and presentation module 50 then integrates the received transaction-based marketing offer with any other transaction information or any other pending information currently being displayed on the integrated user interface 60. As a result, the integration and presentation module 50 may update the user interface screen 400 by including in the marketing offer portion 410 the high-yield CD transaction-based marketing offer.

As previously described, by the user selecting the high-yield CD offer link in the marketing offer portion 410 of the user interface screen 400, the integrated user interface 60 provides the response for more information regarding the high-yield CD as interactive user response information 94 to the rules engine 20. The rules information 70 in the rules engine 20 may route the request through the application integrator 30 for additional information on the high-yield CD by routing the request to the real time alerts and offers sub-application 252. If, however, the customer prefers to follow up on the offer rather than accept the offer during the transaction, the customer may request a follow-up return call. As a result, the rules engine 20 using the application integrator 30, in response to receiving a request for a call-back, as shown in the offers portion 510 of the updated user interface screen 500, may send a referral request to the lead/prospect management and referrals sub-application 238.

Although previously described as integrated in the example discussed with respect to FIG. 6, according to one embodiment, the universal knowledge base application 338 may be updated when a particular user has had success in teller referrals. In response to receiving the referral, the lead/prospect management and referrals sub-application 238, in cooperation with the branch/employee performance metrics sub-application 306, may recognize that the teller is a leading teller referral provider in the region and prompt the universal knowledge base sub-application 338. Accordingly, the universal knowledge base sub-application 338 through the application integrator 30 and via the rules engine 20 may prompt the user asking for his techniques and ideas for teller referrals to be incorporated into the quick tips portion 504 of the updated user interface screen 500 to enable other tellers to learn from his experience. Upon entry of the information requested, the integrated user interface 60 may send the quick tips information as interactive user response information 94 to the universal knowledge base sub-application 338 via the application integrator 30.

According to one embodiment, applications and sub-applications, such as the applications and sub-applications described in FIG. 2 may be classified as either (a) main applications and sub-applications and (b) supporting applications and sub-applications. Main applications and sub-applications are considered primary, or necessary to carry out a transaction specified by the transaction type information 100. Examples of main applications and sub-applications include the customer relationship management application 216, the sales and maintenance application 234, the financial/internal branch transaction application 268, and portions of the branch administration application 300 such as the branch security sub-application 302, the sales incentive tracking sub-application 304, the physical branch layout/ergonomics sub-application 308, the form/supply management sub-application 310 the scheduling and staffing models sub-application 314 and the goals/objectives aligned with incentives sub-application 316. Supporting applications and sub-applications are considered secondary or not necessary to carry out the transaction specified by the transaction type information 100 but are used by the rules engine 20 to enhance the experience and value of the transaction from the client and/or user's perspective. Examples of supporting applications and sub-applications include the knowledge management application 326, the training application 340, the fraud prevention application 210 and portions of the branch administration application 300 such as the branch/employee performance matrix sub-application 306 and the performance management sub-application 312.

Hence, rule information 70 within the rules engine 20 causes the application integrator 30 to communicate with the supporting applications and in response, the supporting applications can call and communicate with other supporting applications or main applications and supporting applications. Similarly, main applications and supporting applications can call and communicate with other supporting applications or main applications. The output for all applications deemed to be relevant, whether main or supporting will be integrated together and displayed at the same time and at one level at the integrated user interface 60. According to one example, the rules engine 20 calls a main application and the main application automatically calls a supporting application.

According to one specific embodiment, a branch user desktop interface provides access to nine-key branch applications with capabilities and associated subcapabilities, through an interaction-driven integrated user interface. The apparatus and method may support numerous operations, for example, training, teller and platform capabilities combined with insight-driven marketing ("IDM"). For example, insight-driven marketing based applications may use information, such as a customer profile or a business transaction, to provide transaction specific and customer specific marketing offers to the customer in order to stimulate the sale of other banking products and services. According to yet another advantage, all relevant information provided by the various applications is provided in a single level interface to the user so that the user need not navigate through different window levels (if a Windows based operating system is used). Accordingly, the apparatus and method integrates multiple applications to provide the user with a single portal front end. According to one embodiment, the apparatus integrates both off-the-shelf applications and custom applications in order to fill an end user's need for access to various capabilities such as training, marketing and sales, administration and transaction capabilities.

It is understood that the rules engine 20 may cause the application integrator 30 to call any other suitable combination of applications and sub-applications, whether they are main or supporting in addition to the embodiments previously described. For example, in response to receiving transaction type information 96, the rules engine 20 may cause the application integrator 30 to call and communicate with both a main application or sub-application and a supporting application or sub-application. Both the main application or sub-application and the supporting application or sub-application may communicate with the application integrator 30 to display information provided by the main application or sub-application and the supporting application or sub-application in an integrated single level user interface. In response to interactive user response information 94, for example, the rules engine 20 may cause the application integrator 30 to communicate with another main application or sub-application or another supporting application or sub-application. As such, the rules engine 20 may cause the application integrator 30 to call or communicate with any main application or sub-application or supporting application or sub-application in response to interactive user response information 94 or communication from the main application or sub-application or supporting application or sub-application.

Similarly, main applications and sub-applications can call and communicate with other supporting applications and sub-applications or main applications and sub-applications. The output for all applications and sub-applications deemed to be relevant, whether main or supporting will be integrated together and displayed at the same time and at one level at the integrated user interface 60. According to one example, the rules engine 20 causes the application integrator 30 to call a main application or sub-application and the main application and sub-application automatically calls a supporting application and sub-application.

An example of rule information 70 may be as shown below:
Rule$_A$ Information:
Transaction Type=Bond Redemption
Main Application=Service request application 294
Supporting Application=Integrated FAQ sub-application 334
If the Integrated FAQ is selected "When do I report interest", then request additional supporting application=Just in time training.

It is understood that the implementation of other variations and modifications of the present invention and its various aspects will be apparent to those of ordinary skill in the art and that the invention is not limited by the specific embodiments described herein. It is therefore contemplated to cover by the present invention any and all modifications, variations, or equivalents that fall within the spirit and scope of the basic underlying principles disclosed and claimed herein.

What is claimed is:
1. A method comprising:
receiving, by a processing device, user identification information,
the user identification information including role information that indicates which applications are available for access by a user based on a user type of the user;
automatically logging, by the processing device and based on the role information identifying one or more first applications available for access by the user, into one or more first applications;

receiving, by the processing device and based on automatically logging into the one or more first applications, transaction type information relating to a transaction;
automatically logging, by the processing device and based on receiving the transaction type information, into one or more second applications;
receiving, by the processing device and based on automatically logging into the one or more second applications, output information from the one or more second applications;
integrating, by the processing device, the output information into a single user interface;
providing, by the processing device and for presentation, the single user interface,
the single user interface including the output information;
receiving, by the processing device, interactive user response information associated with the single user interface;
determining, by the processing device and based on receiving the interactive user response information, a particular application of the one or more second applications;
communicating, by the processing device, with the particular application;
integrating, by the processing device and based on communicating with the particular application, updated information and the output information to produce updated output information; and
providing, by the processing device and for presentation in the single user interface, the updated output information,
the updated output information being used to complete the transaction.

2. The method of claim 1, further comprising:
providing, for presentation, a list of questions,
the list of questions being based on the transaction type information.

3. The method of claim 2, further comprising:
receiving a selection of a question in the list of questions; and
providing, for presentation, an answer to the selected question,
the answer being provided by an application that is different than the one or more first applications and the one or more second applications.

4. The method of claim 1, further comprising:
analyzing the user identification information; and
generating one or more first offers based on a result of the analysis.

5. The method of claim 1, further comprising:
receiving additional identification information,
the additional identification information being different than the user identification information,
where, when communicating with the particular application, the method includes:
communicating with the particular application based on the additional identification information.

6. The method of claim 1, where receiving the interactive user response information includes:
receiving client identification information; and
where the method further comprises:
generating, based on the client identification information, a request for client information authorization.

7. The method of claim 6, further comprising:
receiving, based on generating the request, a customer profile and account information associated with the client identification information.

8. A device comprising:
a memory to store instructions; and
a processor to execute the instructions to:
receive user identification information,
the user identification information including role information that indicates which applications are available for access by a user based on a user type of the user;
automatically log, based on the role information identifying one or more first applications available for access by the user, into one or more first applications;
receive, based on automatically logging into the one or more first applications, transaction type information relating to a transaction;
automatically log based on receiving the transaction type information, into one or more second applications;
receive, based on automatically logging into the one or more second applications, output information from the one or more second applications;
integrate the output information into a single user interface;
provide, for presentation, the single user interface,
the single user interface including the output information;
receive interactive user response information associated with the single user interface;
determine, based on receiving the interactive user response information, a particular application, of the one or more second applications;
communicate, with the particular application;
integrate, based on communicating with the particular application, updated information and the output information to produce updated output information; and
provide, for presentation in the single user interface, the updated output information,
the updated output information being used to complete the transaction.

9. The device of claim 8, where the processor is further to:
provide, for presentation, a list of questions,
the list of questions being based on the transaction type information.

10. The device of claim 9, where the processor is further to:
receive a selection of a question in the list of questions; and
provide, for presentation, an answer to the selected question,
the answer being provided by an application that is different than each of the one or more first applications and the one or more second applications.

11. The device of claim 8, where the processor is further to:
analyze the user identification information; and
generate one or more first offers based on a result of the analysis.

12. The device of claim 8, where the processor is further to:
receive additional identification information,
the additional identification information being different than the user identification information, and where the processor, when communicating with the particular application, is to:
communicate with the particular application based on the additional identification information.

13. The device of claim 8, where the processor, when receiving the interactive user response information, is to:
receive client identification information; and
where the processor is further to:
generate, based on receiving the client identification information, a request for client information authorization.

14. The device of claim 13, where the processor is further to:
receive, based on generating the request, a customer profile and account information associated with the client identification information.

15. A non-transitory computer-readable medium storing instructions, the instructions comprising:
one or more instructions which, when executed by a processor, cause the processor to:
receive user identification information
the user identification information including role information that indicates which applications are available for access by a user based on a user type of the user;
automatically log, based on the role information identifying one or more first applications available for access by the user, into one or more first applications;
receive, based on automatically logging into the one or more first applications, transaction type information relating to a transaction;
automatically log, based on receiving the transaction type information, into one or more second applications;
receive, based on automatically logging into the one or more second applications, output information from the one or more second applications;
provide, for presentation, a single user interface,
the single user interface including the output information;
receive interactive user response information associated with the single user interface;
determine, based on receiving the interactive user response information, a particular application of the one or more second applications;
communicate, with the particular application;
integrate, based on communicating with the particular application, the output information to produce updated output information; and
provide, for presentation in the single user interface, the updated output information,
the updated output information being used to complete the transaction.

16. The non-transitory computer-readable medium of claim 15, where the instructions further include:
one or more instructions to provide, for presentation, a list of questions,
the list of questions being based on the transaction type information;
one or more instructions to receive a selection of a question in the list of questions; and
one or more instructions to provide, for presentation, an answer to the selected question,
the answer being provided by an application that is different than each of the one or more first applications and the one or more second applications.

17. The non-transitory computer-readable medium of claim 15, where the instructions further include:
one or more instructions to analyze the user identification information; and
one or more instructions to generate one or more first offers based on a result of the analysis.

18. The non-transitory computer-readable medium of claim 15, where the instructions further include:
one or more instructions to receive additional identification information,
the additional identification information being different than the user identification information, and
where the one or more instructions to communicate with the particular application include:
one or more instructions to communicate with the particular application based on the additional identification information.

19. The non-transitory computer-readable medium of claim 15, where the one or more instructions to receive the interactive user response information include:
one or more instructions to receive client identification information; and
where the instructions further include:
one or more instructions to generate, based on receiving the client identification information, a request for client information authorization.

20. The non-transitory computer-readable medium of claim 19, where the instructions further include:
one or more instructions to receive, based on generating the request, a customer profile and account information associated with the client identification information.

* * * * *